United States Patent
Abensour et al.

(10) Patent No.: US 8,464,558 B2
(45) Date of Patent: Jun. 18, 2013

(54) GLASS MAKING METHOD

(75) Inventors: Sylvie Abensour, Montlignon (FR); Bertrand Maquin, Paris (FR)

(73) Assignee: Saint-Gobain Emballage, Courbevoie (FR)

( * ) Notice: Subject to any disclaimer, the term of this patent is extended or adjusted under 35 U.S.C. 154(b) by 300 days.

(21) Appl. No.: 12/524,047

(22) PCT Filed: Jan. 25, 2008

(86) PCT No.: PCT/FR2008/050118
§ 371 (c)(1),
(2), (4) Date: Jul. 22, 2009

(87) PCT Pub. No.: WO2008/104653
PCT Pub. Date: Sep. 4, 2008

(65) Prior Publication Data
US 2010/0101275 A1    Apr. 29, 2010

(30) Foreign Application Priority Data

Jan. 26, 2007  (FR) ...................................... 07 52915

(51) Int. Cl.
*C03B 1/00*  (2006.01)
(52) U.S. Cl.
USPC ................... 65/482; 65/29.16; 501/27; 501/1
(58) Field of Classification Search
USPC ............... 65/32.1, 134.4, 134.1, 134.9, 25.3, 65/29.16, 30.1, 135.9, 136.2, 335, 346, 347, 65/474, 482; 501/1, 17, 27, 32, 134
See application file for complete search history.

(56) References Cited

U.S. PATENT DOCUMENTS

| | | | | |
|---|---|---|---|---|
| 2,653,419 A | * | 9/1953 | Brenner et al. | 65/30.1 |
| 3,364,041 A | * | 1/1968 | Swain, Jr. et al. | 501/71 |
| 4,138,235 A | * | 2/1979 | Turner | 65/27 |

FOREIGN PATENT DOCUMENTS

| | | |
|---|---|---|
| DE | 10 2004 001 729 | 8/2005 |
| DE | 102004001729 * | 8/2005 |
| FR | 1 385 272 | 1/1965 |
| JP | 2004 143003 | 5/2004 |
| JP | 2004143003 A * | 5/2004 |

OTHER PUBLICATIONS

JP 2004-143003 (Machine Translation) [online], [retrieved on Jul. 21, 2011], retrieved from PAJ Database (http://www19.ipdl.inpit.go.jp/PA1/cgi-bin/PA1INDEX).*
DE 102004001729 (Machine Translation) [online], [retrieved on Jan. 9, 2012], retrieved from PAJ Database (http://worldwide.espacenet.com/?locale=en_EP).*
Yu. A. Guloyan, Science for Glass Production, Glass and Ceramics, vol. 62, Nos. 9-10, 2005, pp. 301-303.

* cited by examiner

*Primary Examiner* — Philip Tucker
*Assistant Examiner* — Yana Belyaev
(74) *Attorney, Agent, or Firm* — Oblon, Spivak, McClelland, Maier & Neustadt, L.L.P.

(57) ABSTRACT

The subject of the invention is a process for manufacturing red glass containing copper that comprises the steps consisting in:

obtaining a mass of colorless molten glass, free of sulfides, the iron oxide weight content of which is between 0.01 and 0.15%; then conveying said mass of molten glass in a feeder channel, in which copper oxide and tin oxide are added to said mass of molten glass, the partial pressure of oxygen in said mass of molten glass being between $10^{-7}$ and $10^{-4}$; then forming glass objects, especially bottles or flasks from said mass of molten glass; then subjecting said glass objects to a heat treatment so as to develop a red tint.

16 Claims, No Drawings

GLASS MAKING METHOD

The present invention relates to the manufacture of red glass, in particular glass for which the red tint is obtained by subjecting a glass containing copper to a heat treatment (thermocoloration).

It is known to obtain glasses of red color by adding, to the batch materials for forming the glass, small amounts of copper then by subjecting the glass article formed (flat or hollow glass) to a heat treatment, generally around 600° C., in order to generate said color.

The heat treatment that is the source of the coloration has the effect of making nanoparticles of copper metal precipitate within the glass, which particles will diffuse and absorb visible radiation in certain wavelength ranges.

The addition of copper is generally carried out by provision of copper oxide within the mixture of pulverulent batch materials, before the implementation of the melting process. It is then referred to as "tank coloration". In a continuous implementation, this process however has disadvantages. As a general rule, a glass-melting furnace supplies several production lines for glass objects, especially bottles or flasks. Tank coloration therefore inevitably implies that all the production lines provide objects of identical tint. Since the glass-melting furnace is filled with a large amount of molten glass containing copper, and taking into account the existence of convection movements at the very heart of the mass of molten glass, the changes in tint are also very long and may last several whole days during which the glass cannot be sold since it does not correspond to any reference tint. These various considerations mean that tank coloration is not an economically viable alternative in the case of low-quantity productions.

To solve this problem, it is generally known to use a coloring process known as "in feeder", in which the colorants are introduced, generally in the form of glass frits or agglomerates, into the feeder channels or "feeders" located downstream of the melting furnace and upstream of each production line. Thus, it is possible to obtain, in the melting furnace, a single base glass (generally colorless), then to color this base glass in a given feeder, which only supplies a single production line. Moreover, there are no convection movements in the feeder, and stopping the coloration in a feeder makes it possible, in a few hours, to once again have a colorless glass. It is thus economically possible by means of this process to manufacture small series and to improve production flexibility.

Obtaining red glass containing copper by this process has, however, for many years, come up against technical difficulties linked to the control of the oxidation-reduction of the glass. This is because the copper must be reduced during its incorporation into the glass in order to obtain a precipitation of copper metal and therefore the desired color. However the base glass is often oxidized and contains sulfate ions, and its mixing with reduced species, by means of complex oxidation-reduction reactions, generates a large amount of $SO_2$ bubbles ("reboiling") within the glass.

Document JP 2004-143003 teaches that in order to overcome these difficulties, it is necessary to use a reduced base glass of amber tint, defined by a redox greater than 0.4. The redox, defined as the ratio of the content of ferrous iron to the content of total iron, is a means of measuring or controlling the degree of oxidation-reduction of the glass. Considering the high redox, the base glasses used are of amber tint, which is due to the presence of very small amounts (usually a few ppm or tens of ppm) of sulfide ions ($S^{2-}$). The base glass, already reduced, does not then cause reboiling when it is mixed in the feeder with the colorants.

This process is not however, free from drawbacks, since the use of a base glass of amber color is not necessarily compatible with the tints desired for other production lines.

The objective of the invention is to overcome these drawbacks by providing a process for manufacturing red glass containing copper that comprises the steps consisting in:

obtaining a mass of colorless molten glass, free of sulfides, the iron oxide weight content of which is between 0.01 and 0.15%; then conveying said mass of molten glass in a feeder channel, in which copper oxide and tin oxide are added to said mass of molten glass, the partial pressure of oxygen in said mass of molten glass being between $10^{-7}$ and $10^{-4}$; then forming glass objects, especially bottles or flasks from said mass of molten glass; then subjecting said glass objects to a heat treatment so as to develop a red tint.

Specifically, the inventors have demonstrated that, contrary to the teaching of Application JP 2004-143003, it was possible to obtain, by in feeder coloration, red glasses containing copper from a colorless and not amber base glass, the crucial point being to perfectly control the partial pressure of oxygen in the mass of molten glass. For too low a partial pressure of oxygen, the presence of sulfides and therefore an amber coloration are difficult to avoid. For a too high partial pressure of oxygen, on the other hand, a significant generation of bubbles during the addition of the species based on copper and on tin causes a considerable generation of defects in the final glass objects.

Since the base glass is colorless and not amber as in the aforementioned prior art, the process according to the invention has the advantage of allowing the manufacture, on the other lines, of colorless clear glass, or of any type of glass colored by feeder coloration.

The glass obtained is preferably a glass of the soda-lime-silicate type, therefore containing, as main components, $SiO_2$, CaO and $Na_2O$. The mass of molten glass is preferably obtained by mixing batch materials comprising sand, limestone, sodium carbonate and a sulfate. Other batch materials such as feldspar or dolomite are advantageously added to the mixture of batch materials to provide minority oxides such as $Al_2O_3$, $K_2O$ or MgO. The iron oxide is advantageously the only oxide capable of conferring a coloration which is present in the mass of molten glass, since it would then be tricky to obtain the desired red tint. The molten glass preferably does not contain heavy metals such as lead or cadmium.

The sulfate, which is generally sodium sulfate or calcium sulfate (gypsum), is particularly appreciated since it is used to accelerate the melting of the glass and to refine the glass, that is to say to remove the gaseous inclusions trapped in the glass during the decarbonation of the batch materials.

The ratio of the weight of sulfate introduced (expressed in the $SO_2$ form) to the weight of sand is advantageously greater than or equal to 0.3%, or even 0.4% and/or less than or equal to 0.6%, or even 0.5%, so as to optimize the aforementioned effects. The very precise control of the partial pressure of oxygen which is carried out according to the invention allows this significant addition of sulfate without fear of forming sulfides, which are extremely coloring, even for very low contents. To date, the sulfate content introduced was reduced as much as possible, even to zero, when it was a question of manufacturing red glass containing copper by tank coloration, since the formation of sulfides was considered to be inevitable taking into account the inevitably reduced nature of the glass. The inventors have, however, been able to demonstrate that in feeder coloration, the use of the process according to the invention made it possible, on the other hand, to use high sulfate contents, thus generating an increase in the output and an improvement in the quality in terms of residual gaseous inclusions in the glass, without disturbing the coloration of the latter.

The weight content of iron oxide of the base glass is preferably greater than or equal to 0.012%, or even 0.015% for batch material cost reasons. It is preferably less than or equal to 0.1%, or 0.05% and even 0.02%, the high iron oxide contents leading to undesirable green or blue colorations. The iron oxide is inevitably present in the sand, and the minimum content of 0.01% corresponds to the lowest contents that it is possible to achieve taking into account batch materials that are for sale at a reasonable price.

The partial pressure of oxygen in the mass of molten glass during the addition of the copper and tin oxides is preferably greater than or equal to $10^{-6.5}$, or even $10^{-6}$, and/or less than or equal to $10^{-4.5}$, or even $10^{-5}$. This is because too low a partial pressure of oxygen is capable of generating sulfides within the mass of glass, whereas a high partial pressure of oxygen will not allow the generation of the desired red color. The temperature of the mass of molten glass in the feeder channel during the addition of the copper and tin oxides is generally between 1250 and 1350° C., in particular between 1280 and 1320° C. For this reason, the partial pressures of oxygen given for the mass of molten glass are generally measured at 1300° C.

This partial pressure is adjusted by adding, to the batch materials, oxidizing or reducing elements, in particular sulfates or nitrates (oxidizers) and coke, or else sugar or urea (reducers). The sulfate (especially sodium sulfate) and coke are respectively the preferred oxidizing and reducing elements.

The partial pressure of oxygen in a mass of molten glass is generally measured using devices that measure the electromotive force between a reference electrode and a measurement electrode. It may be measured in-line in the feeder channel using, for example, the device sold under the name ReadOX by Read-Ox & Consultancy B.V. It may also be measured off-line, for example in a crucible, in particular using the device sold under the name Rapidox by Glass Service Inc.

In the feeder channel (or feeder), the copper oxide, generally in CuO and/or $Cu_2O$ form, and the tin oxide, generally in SnO and/or $SnO_2$ form, are added to the mass of molten glass, preferably in the form of glass frits or agglomerates. The temperature of the mass of molten glass is then preferably between 1250 and 1350° C., in particular between 1280 and 1320° C., as indicated previously.

Glass frits are small fragments of a particular glass, the composition of which is such that it is capable of melting rapidly at the temperature of the glass in the feeder. These frits are generally based on alkali metal borosilicates, the high contents of boron and sodium oxides enabling this rapid melting. Dissolved in the glass frits is the highest amount possible of coloring oxide. The agglomerates are, on the other hand, prepared by bonding particles of coloring oxide with a liquid alkali metal silicate which is subsequently dried. The agglomerates in general make it possible to incorporate a larger amount of coloring oxide.

Stirring devices make it possible to homogenize the glass in the feeder in order to avoid any heterogeneity of color in the final object. To facilitate the homogenization of the glass, it is in any case preferable that the total content of frits or agglomerates is less than or equal to 10%, especially 5%, or 3% or even 2% relative to the weight of base glass.

A single frit containing both copper oxide and tin oxide may be used. It is however preferable to use a different frit per oxide, for the reasons indicated in the remainder of the text.

The weight content of copper oxide contained in the final glass (expressed by convention in the $Cu_2O$ form, even when a $CuO/Cu_2O$ mixture is generally present) is preferably greater than or equal to 0.1%, or even 0.15%, and/or less than or equal to 0.3%, or even 0.25%. Too low contents of copper oxide do not make it possible to obtain a very pronounced red tint, whereas too high contents lead, on the other hand, to a particularly deep and dark tint.

The tin oxide (expressed by convention in the SnO form) is essential for obtaining the targeted red color, as it acts as a reducing agent with respect to the copper oxide so as to reduce it to copper metal during the subsequent heat treatment. Its weight content is preferably greater than or equal to 0.1%, or even 0.2%. It is preferably less than or equal to 0.7%, or even 0.6%. This is because too high contents have a tendency to increase the cost of the finished glass, while not necessarily being compatible with a low level of frit introduction (content of frits relative to the weight of the base glass). A minimum amount of tin oxide is however necessary to obtain the desired red color.

Taking into account the aforementioned limit in terms of total content of frits or agglomerates introduced, the frit containing copper oxide preferably contains between 15% and 30% by weight of copper oxide (expressed in the $Cu_2O$ form, even when it contains, in general, a $CuO/Cu_2O$ mixture). The frit containing tin oxide preferably contains between 15% and 30% by weight of tin oxide (expressed in the SnO form, even when the frit contains, in general, an $SnO/SnO_2$ mixture). As these contents are very high, it is consequently difficult to incorporate both oxides into a single unique frit.

Moreover, it is preferable, in order to avoid any untimely reboiling, to control the partial pressure of oxygen of the frits themselves. The frit containing copper oxide has a partial pressure of oxygen measured at a temperature of 1100° C. preferably between $10^{-4}$ and $10^{-1}$, or even between $10^{-4}$ and $10^{-2}$. A value of the order of $10^{-3}$ is preferred since it corresponds approximately to the equilibrium partial pressure between cuprous oxide and copper metal. The frit containing tin oxide has a partial pressure of oxygen measured at a temperature of 1100° C. preferably between $10^{-9}$ and $10^{-7}$. A value of the order of $10^{-8}$ is preferred since it corresponds approximately to the equilibrium partial pressure between stannic oxide and stannous oxide.

Other oxides may also be added to the mass of molten glass in the feeder channel. Bismuth oxide ($Bi_2O_3$) is advantageously added, in the form of frits or agglomerates. This oxide promotes the appearance of the red color during the heat treatment, possibly by acting as a nucleating agent for the particles of copper metal. The weight content of bismuth oxide, expressed in the $Bi_2O_3$ form, in the final glass is preferably between 0.02% and 0.20%, in particular between 0.05% and 0.15%. The partial pressure of oxygen in the frit, measured at a temperature of 1100° C., is advantageously of the order of $10^{-5}$ to $10^{-3}$, in particular of the order of $10^{-4}$. The content of bismuth oxide in the frit is advantageously between 15% and 30% by weight. In addition to or in place of the bismuth oxide, elements of the platinoid type such as platinum or palladium, may also act as nucleating agents. According to one embodiment, characterized by a less deep red tint, bismuth oxide is not added to the mass of molten glass.

At the end of the feeder channel, the molten glass is formed by techniques known to a person skilled in the art, in order to obtain glass objects such as bottles, flasks, glass blocks and objects made of flat glass.

The heat treatment to which the glass object obtained is subjected in order to develop the red tint preferably corresponds to the customary annealing treatment to which any glass object is subjected after the forming step. The annealing consists in subjecting the glass to a temperature generally of between 500° C. and 600° C., then in cooling it in a slow and controlled manner. This treatment, customarily carried out in an annealing furnace known as an "annealing lehr" or lehr (in the case of flat glass), makes it possible to remove the mechanical stresses generated in the glass during forming. The fact of being able to develop the red color during this annealing step makes it possible to dispense with any additional heat treatment, which would generate a significant cost premium.

The red glass obtained by the process according to the invention preferably has a light transmission under illuminant C between 5% and 30%, in particular between 10% and 40% for a thickness of 3 mm. The colorimetric coordinates (L*, a*, b*) under illuminant C are preferably between 30 and 70, 35 and 70, and 20 and 65 respectively.

The process according to the invention may be carried out using various types of melting furnaces and feeder channels known to a person skilled in the art. The furnaces and channels are generally produced using refractory materials such as zirconia, alumina or solid solutions of aluminum, zirconium and silicon oxides. The energy necessary to obtain the mass of molten glass may be generated by one or more burners, especially overhead burners, that is to say burners positioned above the glass bath, or by electrodes positioned in the glass bath.

The invention is illustrated using the following nonlimiting examples.

EXAMPLE 1

A mass of molten glass whose weight composition is indicated in table 1 below was obtained in a furnace conventionally used in the field of manufacturing glass bottles by mixing sand, feldspar, sodium carbonate, sodium sulfate and limestone and by bringing the whole assembly to a temperature of at least 1450° C. using burners.

TABLE 1

| | |
|---|---|
| $SiO_2$ | 72.3 |
| $Al_2O_3$ | 1.8 |
| $Fe_2O_3$ | 0.02 |
| CaO | 12.2 |
| MgO | 0.2 |
| $Na_2O$ | 12.5 |
| $K_2O$ | 0.8 |

The base glass was a clear glass of the soda-lime-silicate type containing a small amount of iron oxide as the only coloring oxide. Melting was facilitated via the use of sodium sulfate and coke, the partial pressure of oxygen being controlled however, so as to avoid the formation of sulfides. The weight of sodium sulfate introduced relative to the weight of sand was 0.8%, corresponding to a weight of sulfate (expressed in the $SO_3$ form), relative to the weight of sand, of 0.45%.

The mass of molten glass was conveyed (in the context of a continuous process) toward feeder channels that each supply several bottle-forming machines, one of said channels being equipped with an installation dedicated to adding coloring frits. This type of installation is conventionally used on lines for producing glass bottles; it is consequently well known to a person skilled in the art. The partial pressure of oxygen in the feeder channel was measured using a probe sold under the name ReadOx by Read-Ox & Consultancy B.V. at 1300° C., the temperature in the channel during the addition of the frits, the partial pressure of oxygen was $10^{-4.3}$. Three frits were added to the base glass, each respectively comprising copper oxide in a weight content of 22.5% (the copper oxide being expressed in the CuO form), tin oxide in a weight content of 22.5% (the tin oxide being expressed in the $SnO_2$ form), bismuth oxide in a weight content of 22.5% (the bismuth oxide being expressed in the $Bi_2O_3$ form). The partial pressures of oxygen measured at a temperature of 1100° C. using the Rapidox probe sold by Glass Service, Inc. were respectively $10^{2.2}$, $10^{-8.5}$ and $10^{-4}$.

The content of frits relative to the weight of base glass was 1.2% for the copper frit, 2.7% for the tin frit and 0.6% for the bismuth frit, the weight contents of copper, tin and bismuth oxides in the final glass consequently respectively being 0.27% (expressed in the CuO form), 0.6% (expressed in the $SnO_2$ form) and 0.13% (expressed in the $Bi_2O_3$ form).

After forming, the bottles obtained were conveyed to an annealing lehr so as to subject them to a heat treatment (known as annealing), intended to release the mechanical stresses due to the forming process. The desired red color was obtained with the aid of this annealing treatment.

EXAMPLE 2

Example 2 is distinguished from example 1 by the fact that the partial pressure of oxygen of the base glass at 1300° C., measured in the feeder channel, was $10^{-5.3}$. This lower partial pressure of oxygen was obtained by the addition of a higher amount of coke.

The same coloring frits were used, but the contents of frits relative to the weight of base glass were different: 1.0% for the copper frit, 2.4% for the tin frit and 0.4% for the bismuth frit, the weight contents of copper, tin and bismuth oxides in the final glass consequently respectively being 0.22% (expressed in the CuO form), 0.55% (expressed in the $SnO_2$ form) and 0.1% (expressed in the $Bi_2O_3$ form).

After revelation of the color during the annealing treatment, the glass had a more pronounced red color than in the case of example 1, even though the content of copper oxide was lower. The use of a more reduced base glass (but nevertheless free of sulfides) therefore allows the formation of a greater number of nanoparticles of copper metal that are the source of the coloration.

The invention claimed is:

1. A process for manufacturing red glass comprising copper, the process comprising:
   (1) obtaining within a glass melting furnace a mass of colorless molten glass formed by melting at least one batch material comprising sand, wherein
   said mass is free of sulfides,
   a weight content of iron oxide in said mass is between 0.01 and 0.15%, and
   a ratio of the weight of sulfate (in $SO_3$ form) of said mass to the weight of sand is between 0.3 and 0.6%;
   (2) conveying said mass of colorless molten glass, having a partial pressure of oxygen of between $10^{-7}$ and $10^{-4}$, in a feeder channel; then
   (3) adding within the feeder channel copper oxide and tin oxide to said mass of colorless molten glass to form a copper-containing molten glass, such that a partial pressure of oxygen in said mass of colorless molten glass within the feeder channel is between $10^{-7}$ and $10^{-4}$;
   (4) forming a glass object from said copper-containing molten glass; then (5) heat treating said glass object to develop a red tint and to form a red glass object.

2. The process according to claim 1, wherein the mass of colorless molten glass is obtained by mixing batch materials comprising sand, limestone, sodium carbonate and a sulfate.

3. The process according to claim 1, wherein the weight content of iron oxide in the mass of colorless molten glass is between 0.012% and 0.05%.

4. The process according to claim 1, wherein the partial pressure of oxygen in the mass of colorless molten glass conveying (2) within the feeder channel is between $10^{-6}$ and $10^{-4}$.

5. The process according to claim 1, wherein the copper oxide and the tin oxide are added to the mass of colorless molten glass in the form of at least one glass frit or agglomerate.

6. The process according to claim 5, wherein a total content of the at least one glass frit or agglomerate is less than or equal to 10%, relative to the weight of the mass of colorless molten glass.

7. The process according to claim 5, wherein at least one glass fit or agglomerate comprising copper oxide comprises between 15 and 30% by weight of copper oxide (expressed in the $Cu_2O$ form).

8. The process according to claim 5, wherein at least one glass fit or agglomerate comprising copper oxide has a partial pressure of oxygen, measured at a temperature of 1100° C., of between $10^{-4}$ and $10^{-1}$.

9. The process according to claim 5, wherein at least one glass frit or agglomerate comprising tin oxide comprises between 15 and 30% by weight of tin oxide (expressed in the SnO form).

10. The process according to claim 5, wherein at least one glass frit or agglomerate comprising tin oxide has a partial pressure of oxygen, measured at a temperature of 1100° C., of between $10^{-9}$ and $10^{-7}$.

11. The process according to claim 5, wherein a total content of the at least one glass frit or agglomerate is less than or equal to 5% relative to the weight of the mass of colorless molten glass.

12. The process according to claim 5, wherein at least one glass frit or agglomerate comprising copper oxide has a partial pressure of oxygen, measured at a temperature of 1100° C., of between $10^{-4}$ and $10^{-2}$.

13. The process according to claim 1, further comprising adding, within the feeder channel, bismuth oxide ($Bi_2O_3$) to the mass of colorless molten glass, said bismuth oxide being in the form of at least one frit or agglomerate.

14. The process according to claim 1, wherein the heat treating is an annealing treatment.

15. The process according to claim 1, wherein the weight content of iron oxide in the mass of colorless molten glass is between 0.015% and 0.05%.

16. The process according to claim 1, wherein the red glass object has a light transmission under illuminant C of between 5% and 30% for a thickness of 3 mm.

* * * * *